(12) United States Patent
Keshava et al.

(10) Patent No.: US 9,275,164 B2
(45) Date of Patent: Mar. 1, 2016

(54) GROUPING AND PRESENTING SEARCH QUERY RESULTS

(75) Inventors: Samarth Keshava, New York, NY (US); Matias Pelenur, Brooklyn, NY (US); Jeremy Silber, New York, NY (US)

(73) Assignee: Google Inc., Mountain View, CA (US)

( * ) Notice: Subject to any disclaimer, the term of this patent is extended or adjusted under 35 U.S.C. 154(b) by 850 days.

(21) Appl. No.: 12/635,447

(22) Filed: Dec. 10, 2009

(65) Prior Publication Data

US 2015/0161124 A1 Jun. 11, 2015

Related U.S. Application Data

(60) Provisional application No. 61/121,369, filed on Dec. 10, 2008.

(51) Int. Cl.
*G06F 17/30* (2006.01)
*G06F 7/00* (2006.01)

(52) U.S. Cl.
CPC .................. *G06F 17/30905* (2013.01)

(58) Field of Classification Search
CPC .................................................. G06F 17/3005
USPC ....................................................... 707/709
See application file for complete search history.

(56) References Cited

U.S. PATENT DOCUMENTS

| | | | | |
|---|---|---|---|---|
| 7,634,471 B2* | 12/2009 | Chen et al. | ........ | G06F 17/30112 707/999.003 |
| 7,644,069 B2* | 1/2010 | Chen et al. | ........ | G06F 17/30106 707/723 |
| 7,912,847 B2* | 3/2011 | Lagad et al. | ................. | 707/758 |
| 8,204,916 B2* | 6/2012 | Dawson et al. | ... | G06F 17/30112 707/805 |
| 8,495,102 B2* | 7/2013 | Fulton | ............... | G06F 17/30112 707/802 |
| 9,043,314 B2* | 5/2015 | Chen et al. | ........ | G06F 17/30867 707/722 |
| 2002/0023091 A1* | 2/2002 | Silberberg et al. | ........ | 707/103 Y |
| 2004/0019588 A1* | 1/2004 | Doganata et al. | .................. | 707/3 |
| 2005/0060290 A1* | 3/2005 | Herscovici et al. | ............... | 707/3 |
| 2007/0073894 A1* | 3/2007 | Erickson et al. | .............. | 709/230 |
| 2007/0250468 A1* | 10/2007 | Pieper | .............................. | 707/1 |
| 2007/0256003 A1* | 11/2007 | Wagoner et al. | ........... | 715/501.1 |

(Continued)

OTHER PUBLICATIONS http://www.customizegoogle.com/add-favicons-to-google-search-results.html, CustomizeGoogle: Add favisons to Google search result, Oct. 11, 2008, retrieved on Feb. 4, 2013, 2 pages.

(Continued)

*Primary Examiner* — Pavan Mamillapalli
(74) *Attorney, Agent, or Firm* — Fish & Richardson P.C.

(57) ABSTRACT

Methods, systems, and apparatus, including computer program products, for presenting search results. In one aspect, a method includes receiving a query and determining whether it is desirable to group search results responsive to the query. If so, the method further includes grouping search results by, for example, domain and displaying an indicator (e.g., a favicon) in proximity to a URL associated with search results that are related to the domain. In another aspect, a method includes crawling web properties to determine if a domain has an associated indicator, and storing an identifier associated with the indicator in a database that associates the identifier with one or more words indicative of the domain. Upon receipt of a query that includes the one or more words, the method further includes retrieving the indicator and displaying the indicator in proximity to a link describing the domain.

16 Claims, 8 Drawing Sheets

(56) References Cited

U.S. PATENT DOCUMENTS

| | | | |
|---|---|---|---|
| 2008/0059515 A1* | 3/2008 | Fulton | G06F 17/30112 707/999.103 |
| 2008/0294602 A1 | 11/2008 | Permandla et al. | |
| 2009/0119268 A1* | 5/2009 | Bandaru et al. | 707/3 |
| 2009/0187548 A1* | 7/2009 | Ji et al. | 707/4 |
| 2011/0119242 A1* | 5/2011 | Chen et al. | G06F 17/30867 707/706 |

OTHER PUBLICATIONS http://developer.yahoo.com/searchmonkey/, SearchMonkey, Oct. 27, 2008, retrieved on Feb. 4, 2013, 3 pages.

http://www.keyboardr.com, Dec. 2, 2008, retrieved on Feb. 4, 2013, 2 pages.

* cited by examiner

2000

[ james bond imdb — 2010 ] ( Search )   Advanced Search
                                         Preferences

Web

Quantum of Solace (2008) — 2020
Seeking revenge for the death of his love, secret agent James Bond set out to stop ... Visit
IMDb for Photos, Showtimes, Cast, Crew, Reviews, Plot Summary, ...
www.imdb.com/title/tt0830515 - 60k - Cached - Similar Pages — 2040

2030 — IMDb: Casino Royale
    In his first mission, James Bond must stop Le Chiffre, a banker to the world's... Visit IMDb
    for Photos, Showtimes, Cast, Crew, Reviews, Plot Summary, ...
    www.imdb.com/title/tt0381061 - 62k - Cached - Similar Pages
    More results from www.imdb.com >>

BondMovies.com: News: IMDB April Bond 21 Rumors
Apr 5, 2004 ... The Art (and Business) of the James Bond Theme Song ... The Latest **James
Bond Headlines. IMDB April Bond** 21 Rumors ...
www.bondmovies.com/news/8.shtml - 18k - Cached - Similar Pages

James Bond Casino (2006) (TV)
With Martin Campbell, Daniel Craig, Maryam d'Abo. 5 episode Tv special (1, 8, 15, 22 and 29
November 2006) about James Bond because of the premiere of Casino ...
uk.imdb.com/title/tt0929765/maindetails - 38k - Cached - Similar Pages

James Bond - IMDb Wikia
Jun 2, 2007 ... James Bond (also known as 007) is a fictional british secret agent, created in the
early 1950's by Ian Fleming. This keyword should be added ...
imdb.wikia.com/wiki/James_Bond - 61k - Cached - Similar Pages james bond.imdb - TV.com
james bond,imdb at TV.com. Related tags: david giammarco,for your eyes only,mtv, swing
vote.
www.tv.com/index.php?type=42&action=get_items_for_tag&qs=james%20bond,imdb - 32k -
Cached - Similar Pages

IMDb Updates with 'Bond 22' Release Dates - James Bond 007 ...
Dec 31, 2007 ... While it is wise to note that the only Bond 22 release date thus far confirmed
by Eon Productions is 7 November 2008, the IMDb has been ...
commanderbond.net/article/4755 - 26k - Cached - Similar Pages

[ imdb james bond ⟵ 3010 ] [Search]  Advanced Search
                                     Preferences

Web

IMDb: Casino Royale
In his first mission, James Bond must stop Le Chiffre, a banker to the world's... Visit IMDb for Photos, Showtimes, Cast, Crew, Reviews, Plot Summary, ...
(IMDb) www.imdb.com/title/tt0381061 - Cached - Similar Pages
⤺ 3006
IMDb - Daniel Craig
Visit IMDb for Photos, Filmography, Discussions, Bio, News, Awards, Fan Sites. ... aka James Bond 007 - Casino Royale (Germany); (Infamous (2006) . ...
(IMDb) www.imdb.com/name/nm0185819/ - Cached - Similar Pages IMDb: Die Another Day
James Bond is sent to investigate the connection between a North Korean terrorist ... Visit IMDb for Photos, Showtimes, Cast, Crew, Reviews, Plot Summary, ...
(IMDb) www.imdb.com/title/tt0246460/ - Cached - Similar Pages

3004

Quantum of Solace (2008)
Seeking revenge for the death of his love, secret agent James Bond set out to stop.. Visit IMDb for Photos, Showtimes, Cast, Crew, Reviews, Plot Summary, ...
(IMDb) www.imdb.com/title/tt0830515 - 60k - Cached - Similar Pages

3005

James Bond (Character)
James Bond (Character) on IMDb: Movies, TV, Celebs, and more ...
(IMDb) www.imdb.com/character/ch0000007/ - Cached - Similar Pages
⤺ 3006
James Bond 007: Yesterday and Today (1996) (V) - Movie connections
James Bond 007: Yesterday and Today on IMDb: Movies, TV, Celebs, and more ... You may report errors and omissions on this page to the IMDb database managers ...
(IMDb) uk.imdb.com/title/tt0279150/movieconnections - Cached - Similar Pages
⤺ 3003
James Bond (film series) - Wikipedia, the free encyclopedia
The casting involved a widespread search for a new actor to portray James Bond, even ...

FIG. 3A 3020
3029

[ hp printer ink ] [ Search ]

Web   Shopping

HP Printer Ink
www.hp.com   Find Great Deals on HP Printer Ink Cartridges. Show Now & Save!
HP Printer Supplies
www.4InkJets.com/HP   Save time and money on ink & toner for HP printers at 4inkjets.com
HP Printer Cartridge
www.Staples.com   3 Easy Ways to Enjoy Free Shipping! Shop Staples.com Today.

HP Printer ink cartridges, laser toner cartridges, and paper
Reliable, money-saving results: Original HP printer ink cartridges and laser toner cartridges are proven to perform. Content starts here ...
welcome.hp.com/country/us/en/prodserv/laser-toner-ink-cartridges.html -
3036 — Similar Pages - Note this

HP Printer ink cartridges
Find the right HP printer ink cartridges, laser toner cartridges, paper, and printer supplies for your HP printer. ...
printer-ink-cartridges.hp.com/ - Similar Pages - Note this Discount printer ink - do not believe the hype - HP Small and ...
Don't be fooled by discount printer ink and cheap ink cartridge vendors. While these second hand cartridges may be cheaper, they often don't work, ...
3034 — www.hp.com/sbso/product/supplies/printer-ink-refill.html - 52k -
Cached - Similar Pages - Note this Laser Printers, Inkjet Printers, Photo Printers - HP
Help me choose an HP printer ... Use original HP supplies, from ink cartridges to network cards, ... Printer ink, toner & paper for business or home ...
welcome.hp.com/country/us/prodserv/printing_multifunction.html - 147k -
3036 — Cached - Similar Pages - Note this

HP Printer ink and laser toner cartridge and paper supplies - HP ...
HP.com to find compatible HP print cartridge, HP ink and inkjet cartridge, HP toner cartridge, and paper supply.
www.hp.com/sbso/product/supplies/landing.html - 55k -
Cached - Similar Pages - Note this
More results from hp.com>>        ⌐ 3030

Shopping results for hp printer ink
HP 95 Print cartridge – Color (cyan, magenta ...   $10 to $41 - 361 stores
HP 97 Print cartridge – Color (cyan, magenta ...   $10 to $82 - 341 stores
Canon PIXMA MX850 Color Ink-jet- Fax/copier ...$146 to $309 - 168 stores

GROUPING AND PRESENTING SEARCH QUERY RESULTS

CROSS-REFERENCE TO RELATED APPLICATIONS

This application claims the benefit under 35 U.S.C. §119(e) of U.S. Provisional Patent Application No. 61/121,369 title "Presenting Search Query Results," filed Dec. 10, 2008, which is incorporated here by reference.

BACKGROUND

This specification relates generally to information presentation.

Internet search engines aim to identify resources (e.g., web pages, images, text documents, multimedia context) that are relevant to a user's needs and to present information about the resources in a manner that is useful to the user. Conventional Internet search engines return a set of search results in response to a user-submitted query. Some search results can be related, such as by being associated with the same web domain (i.e., "domain").

SUMMARY

This specification describes technologies relating to grouping search results by, for example, domain and displaying an indicator (e.g., a favicon) in proximity to a URL associated with search results that are related to the domain.

In general, in one aspect, a method is provided for displaying results associated with a search. The method includes identifying a query, the query including one or more terms, determining if one or more terms in the query is associated with a domain, determining if grouping of search results from the domain is desirable; and if so, rearranging results derived from the query to group a number of results together to form a set that are associated with the domain and presenting the results including presenting the set.

Aspects of the invention can include none, one or more of the following features. Determining if one or more terms in the query is associated with a domain can include determining if the query includes a domain or determining if search results associated with the query include multiple results from a same domain. Rearranging results can include promoting results to a higher level than a rank associated with the results would ordinarily indicate so as to allow for the grouping of results from a same domain. Rearranging results can be omitted if a domain name associated with the domain is too generic or if a diversity of search results indicates that grouping is impractical.

In another aspect a computer implemented method for displaying results associated with a search is provided. The method includes identifying a query, the query including one or more terms. The method includes determining if the query is associated with a domain, determining if the domain has an associated indicator, determining if grouping of search results from the domain is desirable; and if so, rearranging results derived from the query to group a configurable number of results together in a set that are associated with the domain and presenting the results including presenting the set and the indicator along with at least one of the results in the set.

Aspects of the invention can include none, one or more of the following features. Determining if the query is indicative or associated with a domain can include determining if the query is indicative or associated with a domain based on results returned from the query or terms of the query. Determining if the domain includes an indicator can include evaluating an index of indicators to identify a matching indicator based on one or more words associated with the domain. The indicator can be a favicon. The favicon can be assigned by the domain holder. The indicator can be an icon. Rearranging results can include promoting results to a higher level than a rank associated with the results would ordinarily indicate so as to allow for the grouping of results from a same domain. Rearranging results can be omitted if a domain name associated with the domain is too generic or if the diversity of search results indicates that grouping is impractical. Presenting the results can include presenting the indicator along with at least one of the results in the group next to a URL associated with the result.

In another aspect a method is provided that includes crawling web properties to determine if a domain has an associated indicator, storing an identifier associated with the indicator in a database indexed by one or more words indicative of the domain, retrieving the indicator upon receipt of a query that includes the one or more words and displaying the indicator in proximity to a link describing the domain and in response to a search for content associated with the domain.

Aspects of the invention can include none, one or more of the following features. The method can include grouping search results in response to the query by domain.

In another aspect a method is provided that includes determining that a favicon is associated with a domain, receiving a query that indicates or suggests the domain and displaying query results. Displaying query results includes grouping a number of results associated with the domain together irrespective of their ordinary ranking and displaying the favicon next to a URL associated with a result that is related to the domain.

In another aspect a system for presenting search results in response to a query is provided. The system includes a search engine that provides search results in response to a query having one or more query terms, a domain checker that determines if the query is associated with a domain and a results optimizer that determines if grouping of results associated with the domain is desirable, and if so, rearranges results derived from the query to group a number of results together that are associated with the domain and presents the results including the group.

In another aspect a system for presenting search results in response to a query is provided. The system includes a search engine that provides search results in response to a query having one or more query terms, a domain checker that determines if the query is associated with a domain, a favicon index that includes a mapping between domains and favicons and a results optimizer that presents the results including an associated favicon in close proximity to a URL associated with a given result.

Particular embodiments of the subject matter described in this specification can be implemented to realize one or more of the following advantages. Search results that are related can be grouped and presented together in response to a query. For example, results from a search query can be grouped by domain. A predetermined number of search results from a same domain can be grouped and presented together. The grouping overrides a conventional ranking of the results from different domains and allows related results to be presented together. In addition, one or more indicators readily identifiable of, for example, a domain can be presented in proximity to a URL as part of a search result returned by a search engine.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 illustrates an example web page of search results.

FIG. 3A illustrates an example web page of the same search results rearranged so that the search results related to a domain are grouped and marked with an indicator.

FIG. 3B shows another example web page with search results organized by domain.

Like reference numbers and designations in the various drawings indicate like elements.

DETAILED DESCRIPTION

Figure 1:
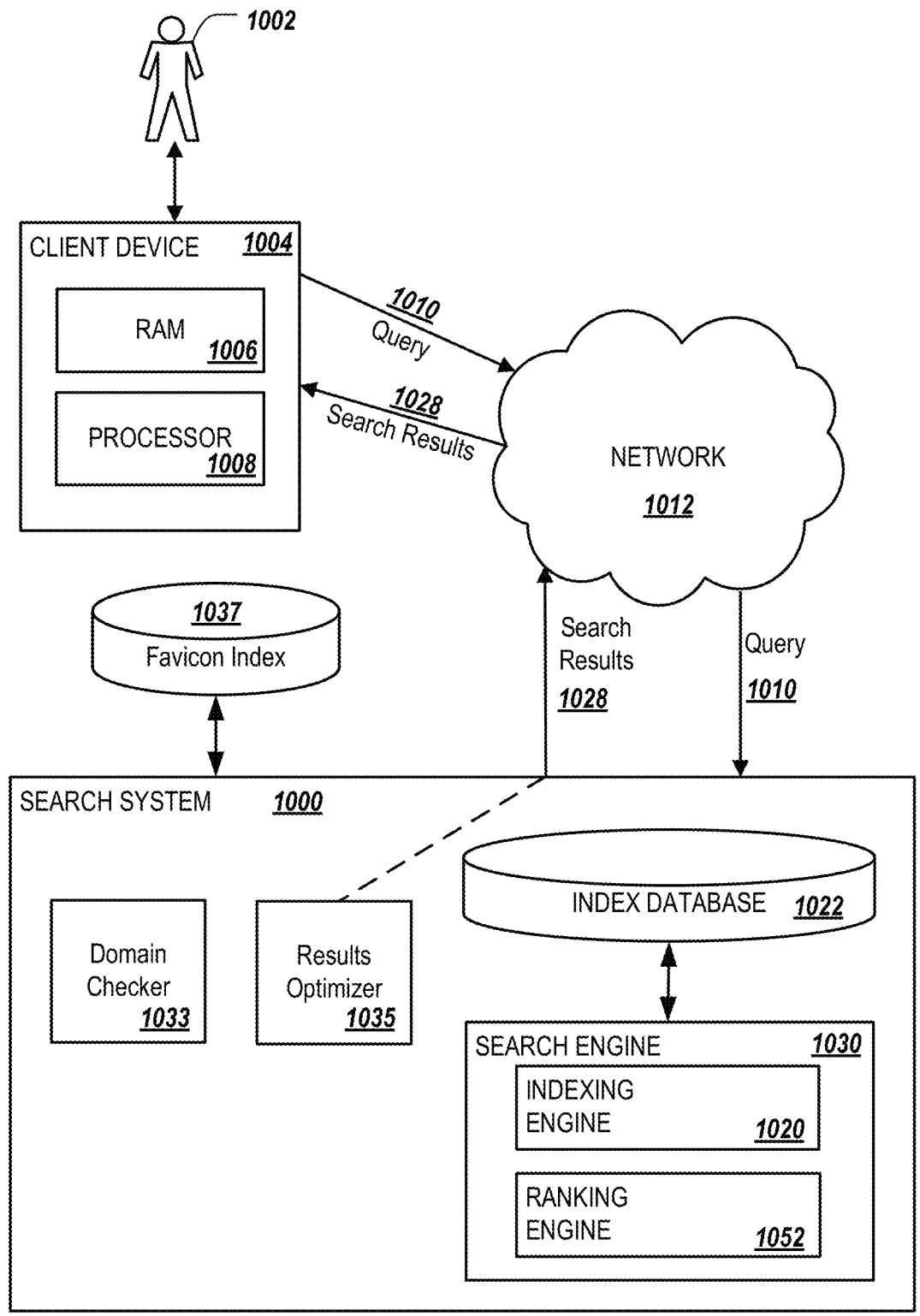
FIG. 1 shows an example search system.

This disclosure describes an optimization for the presentation of search results in response to a search query including the use of indicators and grouping.

In some implementations the presentation includes the use of indicators to better identify, on a search results page, the domains from which certain search results are derived. For example, the indicators can be favicons, icons or other symbols. A favicon is an icon or other symbol, displayed on a computer screen, that is representative of the domain. For example, the favicon for an automobile manufacturer might be a small picture or drawing of one of their cars, or it might be their company's logo. Over time, a computer user may learn to recognize favicons of common or favorite domains, including the domains that the user may visit regularly, or that appear often in search results. In some implementations, indicators such as favicons can be assigned by the domain holder.

The system can include a process for crawling and storing (e.g., for later use) the indicators that various domains use for identifying themselves on the web. These indicators are commonly known as "favicons" and currently appear, for example, in various browser address bars and browser tabs. In response to a search query, the system can evaluate the search results and locate favicons to be displayed with, for example, groups of search results organized by the domains associated with the favicons. The exact rules for when these indicators are to appear and for which results can depend on various factors.

In addition to providing indicators, the system proposed can group related results in the presentation of search results to a user (e.g., grouping results from a same domain (with or without a top level), host, sub-domain, organization, or other structure). Grouping can be based on, for example, relatedness such as by domain or host associated with a given search result. As will be described in greater detail below, grouping of related results may require an evaluation of both the search query and/or the returned results. Initially a determination is made if the query indicates a request for related results. In some implementations, the initial determination checks if the query is associated with a domain. A query can be associated with a domain when it is indicative of the domain or otherwise associated with the domain. Determining if one or more terms in a query are associated with a domain can include determining if the query includes a domain name. In some implementations, determining if one or more terms in the query are associated with a domain further includes using keywords based on the query terms to identify a domain name. In some implementations, determining if one or more terms in the query is associated with a domain further includes determining if search results associated with the query include multiple results from a same domain.

In some implementations, if relatedness is indicated (e.g., a query includes a term that is a domain name), then the system evaluates the search results to determine if one or more of the results should be grouped. The exact rules for when results are grouped can depend on various factors, including for example, the number of results corresponding to a given domain, the likelihood that a domain name is too generic, the diversity of the overall results sets, and/or other factors. Evaluation can include a determination of a number of results to group. If grouping is desirable, then the system can group the predetermined number of results in a set and present the set along with other sets or individual search results.

Grouping search results and displaying associated favicons can have several advantages. A user can quickly recognize that multiple search results for a query are coming from the same domain. The user can also easily identify which domain it is. For instance, a query that explicitly refers to a specific domain (e.g., "XYZ" in "XYZ printer ink") may include results from the actual domain specified (e.g., web pages on the XYZ.com domain that allow you to re-order printer ink), as well as results from other domains (e.g., web pages that describe or comment on printer ink from XYZ). Differentiating these groups of results, as well as identifying the domain for the results, conventionally requires that the user explicitly read the URLs on the search results page, which can be difficult or time-consuming. By grouping and providing the aforementioned indicators, a user can quickly and easily review the results provided by a search engine.

FIG. 1 shows an example search system 1000 for providing search results relevant to submitted queries as can be implemented in the Internet, an intranet, or another client and server environment. The search system 1000 is an example of an information retrieval system in which the systems, components, and techniques described below can be implemented. In some implementations, the search system 1000 can be used to provide Internet search results in response to a query, where the search results are organized and grouped by associations with World Wide Web domain names. In addition, the search system 1000 can display each domain's favicon or other icon associated with webpages for that domain when presenting search results.

A user 1002 can interact with the search system 1000 through a client device 1004. For example, the client 1004 can be a computer coupled to the search system 1000 through a local area network (LAN) or wide area network (WAN), e.g., the Internet. In some implementations, the search system 1000 and the client device 1004 can be one machine. For example, a user can install a desktop search application, such as a web browser, on the client device 1004. The client device 1004 will generally include a random access memory (RAM) 1006 and a processor 1008.

A user 1002 can submit a query 1010 to a search engine 1030 within a search system 1000. When the user 1002 submits a query 1010, the query 1010 is transmitted through a network to the search system 1000. The search system 1000 can be implemented as, for example, computer programs running on one or more computers in one or more locations that are coupled to each other through a network. The search system 1000 includes an index database 1022 and a search engine 1030. The search system 1000 responds to the query 1010 by generating search results 1028, which are transmitted through the network to the client device 1004 in a form that can be presented to the user 1002 (e.g., as a search results web page to be displayed in a web browser running on the client device 1004).

When the query 1010 is received by the search engine 1030, the search engine 1030 identifies resources that match the query 1010. The search engine 1030 will generally include an indexing engine 1020 that indexes resources (e.g., web pages, images, or news articles on the Internet) found in a corpus (e.g., a collection or repository of content), an index database 1022 that stores the index information, and a ranking engine 1052 (or other software) to rank the resources that match the query 1010. The indexing and ranking of the resources can be performed using conventional techniques. The search engine 1030 can transmit the search results 1028 through the network to the client device 1004 for presentation to the user 1002.

The search system 1000 also includes a domain checker 1033 and a results optimizer 1035 which are used to optimize the search results 1028 including grouping results and presenting indicators, such as favicons. In general, in some implementations, the domain checker 1033 determines if the query 1010 is indicative of, or associated with, a domain. While reference is made to determining if a query includes or relates to a domain, other indications of relatedness of results can also be used. For example, search results can be considered related when they share the same hosting entity.

In general, in some implementations, the results optimizer 1035 performs numerous functions including one or more of: determining if an indicator is associated with a domain, evaluating the search results 1028, grouping results including rearranging the search results 1028 derived from the query 1010 to group a predetermined number of results together that are associated with the domain, and presenting the rearranged results. In some implementations, presenting the results includes presenting the indicator along with at least one of the results in the group.

The search system 1000 can use a favicon index 1037 that identifies favicons for specific domains. The favicon index 1037 can exist external to the search system 1000 (e.g., accessible over the Internet), or the favicon index 1037 can be part of the search system 1000 (e.g., a locally-stored data table). Each entry in the favicon index 1037 can consist of, for example, a data pair including words associated with the domain name (e.g., the domain name or one or more words indicative of the domain) and the corresponding indicator, favicon or icon associated with the domain. For example, an entry for ABC Motors, Inc. can be associated with the domain ABCMotors.com and include a corresponding indicator (e.g., a car symbol, corporate logo, etc.) for the company. In some implementations, the favicon index 1037 can include other fields, such as data fields identifying when the favicon information for the domain was created or when it was last updated or verified. Other fields can identify the type of format of the favicon, such as JPG or other format.

In some implementations, the information used to build the favicon index 1037 can be produced by crawling web properties of web pages to determine if a domain has an associated indicator. For example, the crawling process can search for files (e.g., ".ico" files or other file extensions) that are commonly used for storing icons. When no such file exists, the crawling function can generate a default favicon, such as by using a thumbnail of the largest image on the domain's home page, if that can be determined. Upon finding or generating the indicator (e.g., a favicon), an identifier associated with the indicator can be stored in a database indexed by one or more words indicative of the domain. Words indicative of the domain are one or more words included in the domain, for example, domain name "ABCMotors" for ABCMotors.com. While reference is made to having the indicators available for retrieval from the index, alternatively the indicator can be retrieved in real-time upon receipt of a query.

Domain Checker

The domain checker 1033 determines whether a query includes search terms that indicate a preference, for example, for a particular domain. By providing a domain name as a search term, the user may be inferred to be specifying a particular preference for results that are related to the specified domain. The domain checker 1033 can determine the domain(s) associated with a query in different ways. For example, the domain checker 1033 can examine the terms in the query or the keywords associated with the query and determine whether an individual term is a domain name. Other means for determining whether the user has specified a domain are possible. For instance, if the user enters the query "ABC sports car," the domain checker 1033 can use the "ABC" term to generate a list of domain names that start with or include "ABC." The domain checker 1033 can disambiguate the list by also using the terms "sports" and "car", for example, finally concluding that "ABCMotors.com" is an indicated domain name. In some implementations, the domain checker 1033 can use the user's search history, personal profile information (e.g., interests, hobbies, age, etc.), or other indicators to identify a domain name. For example, if the user's search query is simply "sports car," and the user has visited ABCMotors.com (or the user's profile indicates an interest in cars), the domain checker 1033 can determine that a related domain is "ABCMotors."

Results Optimizer

As described above, the results optimizer 1035 can rearrange the search results 1028 produced by the search engine 1030, grouping the search results by, for example, domain. The search results can then be presented to the user including presenting the group of two or more results associated with the same domain, such as a group of search results for ABC-Motors. These entries can be grouped together at the "top" of the search results display, followed by non-ABCMotors entries.

In some implementations, the number of entries to group in a set is configurable (e.g., dynamically configurable based on one or more criteria such as ranking or environment). In some implementations, the number of entries can be fixed (e.g., predetermined). The configurable number of entries to include in a group may depend on the type of device that the user is using to browse the Internet. For example, while the number of highest-ranked entries to group may be set to five entries if the user is surfing the Internet on his home or office PC, the configurable number of entries may default to a smaller number (e.g., three) if the user is using a webphone or other handheld device.

In some implementations, arranging results includes promoting (e.g., reranking) results so as to allow for the grouping of results from a same domain. For example, the search engine 1030 may produce an initial set of search results 1028 that are ranked based on likely relevance to the user's query. The search results 1028 may contain a mixture of higher-ranked and lower-ranked results associated with the same domain. The results optimizer 1035 can rearrange the search results 1028 in an order different from the original ranked order. The different order can group search results based on their associated domains. For example, if the original ranked order of the search results 1028 includes entries for ABCMotors that are ranked 1, 3, 5, 11 and 30, these entries can be grouped together in a set and presented together at the "top" of the search results display, followed by non-ABCMotors entries ranked 2, 4, 6-10, 12-29, and so on. Other entries related to the domain ABCMotors may exist, but a configurable group count can be used. For example, the system can be configured to display up to five entries from the same domain in the set displayed with the search results.

In some implementations, arranging results in a set is omitted if the domain name is too generic. A domain name can be too generic if it has more than a threshold number of meanings. The threshold can be chosen, for example, empirically. For example, a query may contain the term "fox" which can correspond to an animal, a broadcasting company, or a bookstore. Because the domain name "fox" has more than a threshold number of meanings, and thus might match multiple domains related to different topics, the domain name can be determined to be too generic. The results optimizer 1035 may omit rearranging and grouping the search results 1028 in this example even where one or more domain names can be resolved from the search query. In some implementations, the system 1000 can display a message in the browser window indicating that grouping did not occur for a given term, such as "No grouping occurred for 'fox' due to ambiguous results."

In some implementations, arranging results is omitted if the diversity of search results indicates that grouping is impractical. Grouping can be impractical when an insufficient number of search results can be logically grouped. This can occur when too many (e.g., more than a threshold number of) domains are represented in the search results. For example, if 30 search results are returned by the search engine 1030 in response to a query, where only two entries can logically be grouped (e.g., there are 29 different domains represented), the results optimizer 1035 can decide not to group any results. In some implementations, when grouping is omitted, the system 1000 can display a message in the browser window indicating that grouping did not occur due to a diverse set of results.

FIG. 2 illustrates an example web page 2000 of search results 2005 resulting from a query 2010. The search results 2005 can be organized and ordered in ranked order, such as by first displaying the search results that most closely match the query 2010 (e.g., at the top of the search results in accordance with a ranking score determined by the search engine), followed by search results in decreasing order of responsiveness to the query. Each of the entries in the search results 2005 can be considered a resource (e.g., a web page, image, text document or multimedia context responsive to a query). A search result can include: a title 2020 for the resource, a selectable link 2030 to the resource, and a snippet 2040 of content from the resource. Generally, a snippet 2040 of content includes one or more words, phrases, clauses, or sentences extracted from the textual content of the resource. A phrase is a meaningful sequence of two or more words. The search engine 1030 can extract a contiguous segment or separated segments of textual content from the resource to form a snippet 2040. The search engine 1030 optionally marks the terms of the original query 2010 (e.g., "imbd, "james" and "bond" in the example) in bold font when the query terms appear in the snippets.

FIG. 3A illustrates an example web page 3000 containing search results 3005 in response to a query 3010. The search results 3005 are similar to search results 2005 shown in FIG. 2, but rearranged so that the search results related to a domain are grouped together and each marked with an indicator. A predetermined number of search results 3005 (here six results are included in the group) corresponding to a domain "IMDB" 3003 are grouped together in a group region 3004. The search results can be, for example, the top ranked search results in the domain for the query, according to an original order of search results generated by the search engine. Moreover, a favicon 3006 is displayed to the left of each URL 3003 for each entry in the group region 3004.

FIG. 3B shows another example web page 3020 with search results 3025 organized by an "HP" domain 3030. The search results 3025 are in response to a query 3029 containing the search phrase "hp printer ink." Again, a predetermined number of search results have been grouped and presented as a set (as indicated by group area 3034) followed by other search results that are not part of the set. Here, each of the search results in the set is also marked with an HP favicon 3036. In this case, the favicon 3036 is the logo for the HP company that sells printers and printer accessories.

Grouping

Figure 4:
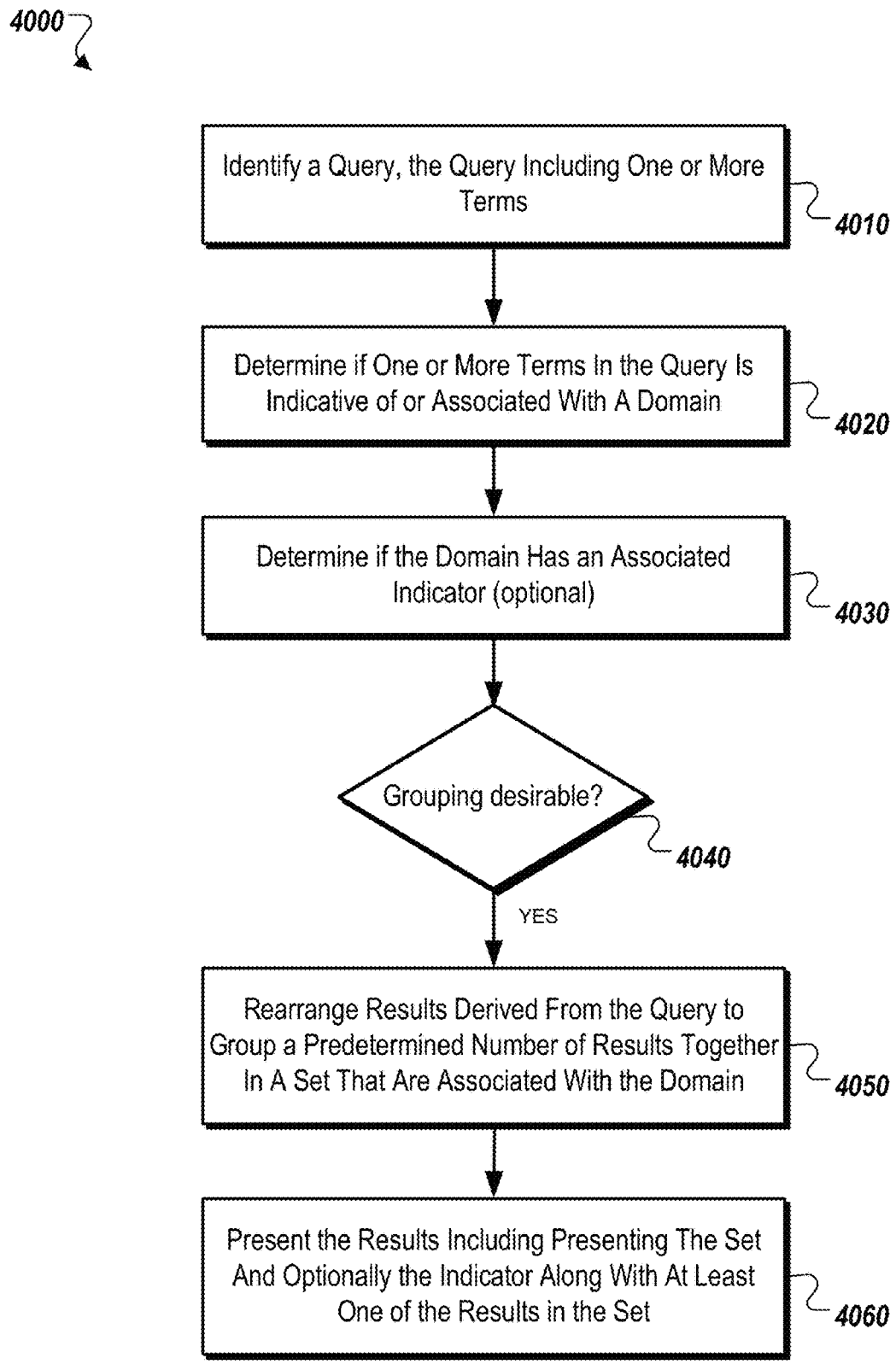
FIG. 4 shows an example method for displaying results associated with a search.

FIG. 4 shows an example method 4000 for displaying results associated with a search. For example, the method 4000 can be a computer-implemented method that provides search results to a user for display on the user's client device 1004. For convenience, the example method 4000 will be described with reference to FIGS. 1 and 3, and a system that performs the method 4000.

The method 4000 begins with the identification of a query, the query including one or more terms (step 4010). For example, referring to FIG. 3A, the query can be the group of search terms that the user enters in the search box 3010 within the browser on the user's client device 1004. For example, the user may enter the search query "imdb james bond". The query 3010 can be received on the user's client device 1004 and provided by the user's browser over the network 1012 to the search system 1000.

Having identified the query, a determination is made if one or more terms in the query is associated with a domain (step 4020). For example, the query 3010 as depicted contains the query terms "imdb", "james" and "bond". If one of the terms is itself the name of a domain (e.g., imdb), such a determination can be made, for example, by locating the domain name in a database of known domains, such as the favicon index 1037. Otherwise, using the query terms as keywords, the search engine 1030 can search the index database 1022 to attempt to identify domain names associated with the keywords. For example, if the user enters "james bond" as the search query 3010, the search engine 1030 may identify "imdb" as a common domain based on the number of search results returned containing "imdb" in the URL. In another example, if the user enters "imdb james bond" as the search query 3010, the search system 1000 can immediately identify imdb as the domain name by using the domain checker 1033 to locate "imdb" in the favicon index 1037.

Optionally, it is determined if the domain has an associated indicator (step 4030). For example, the domain checker 1033 can use the "imdb" domain name to access the favicon index 1037 to locate a favicon associated with the domain.

A determination is made if grouping of search results is desirable (step 4040). For example, results optimizer 1035 may evaluate the identified domain and the search results provided by the search engine 1030 to determine if a set of results should be presented that are associated with the identified domain. If domain grouping is indicated (e.g., a domain is located, the domain is not generic, and the search results are not too diverse), the results derived from the query are rearranged to group a predetermined number of results together in a set that are associated with the domain (step 4050). For example, the results optimizer 1035 can process the search results using known domains associated with the results, and group the entries by domain.

The results are presented, including presenting the set and optionally presenting the indicator along with at least one of the results in the group (step 4060). The resulting rearranged search results 1028 can be sent via the network 1012 to the user's client device 1004 for use by the user's browser. For example, using the domain name "imdb", the user's browser can display the rearranged search results 3005, including a group region 3004 associated with the set which can be labeled with the domain name 3003 (e.g., "imdb").

Favicon Presentation

Figure 5:
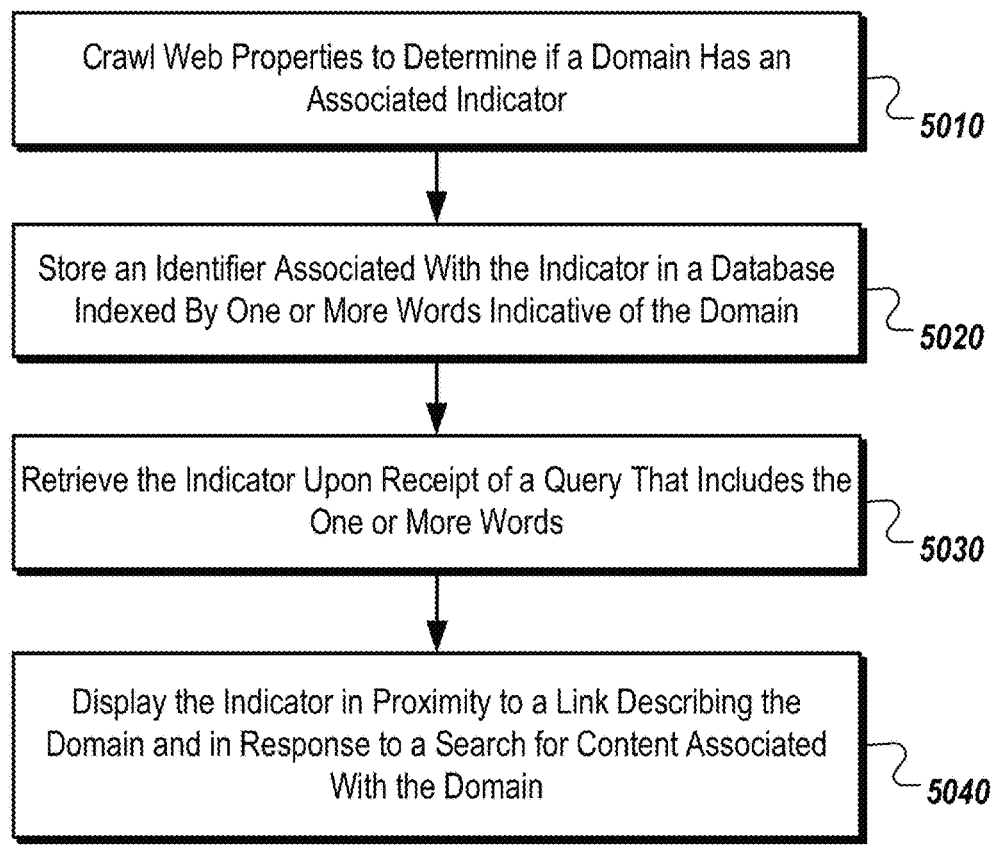
FIG. 5 shows an example process for a method for obtaining indicators (e.g., favicons) from the web and providing the indicators with search results.

FIG. 5 shows an example method 5000 for obtaining indicators (e.g., favicons) from the web and providing the indicators with search results. For example, the method 5000 can be a computer-implemented method that provides and displays indicators in proximity to search results displayed in a web browser on the user's client device 1004.

The method 5000 begins by crawling web properties to determine if a domain has an associated indicator (step 5010). For example, a web crawling service of the search system 1000 can crawl web sites on the Internet and populate the favicon index 1037.

An identifier associated with the indicator is stored in a database indexed by one or more words associated with the domain (step 5020). For example, an identifier for the favicon for CMS News can be stored in the favicon index 1037 in an entry or record for the domain CMSNews.com.

Upon receipt of a query that includes one or more words, the indicator is retrieved (step 5030). For example, if the user searched the internet using a browser on the user's client device 1004 and the query is associated with the domain imdb.com, the indicator (e.g., favicon) for imdb.com is retrieved from the favicon index 1037.

The indicator is displayed in proximity to a link describing the domain and in response to a search for content associated with the domain (step 5040). The link describing the domain can be, for example, a link to one of the search result entries grouped under the domain. For example, the favicon for imdb can be displayed in the user's browser to the left of a URL associated with an entry of the search results 3005.

Grouping and Favicons

Figure 6:
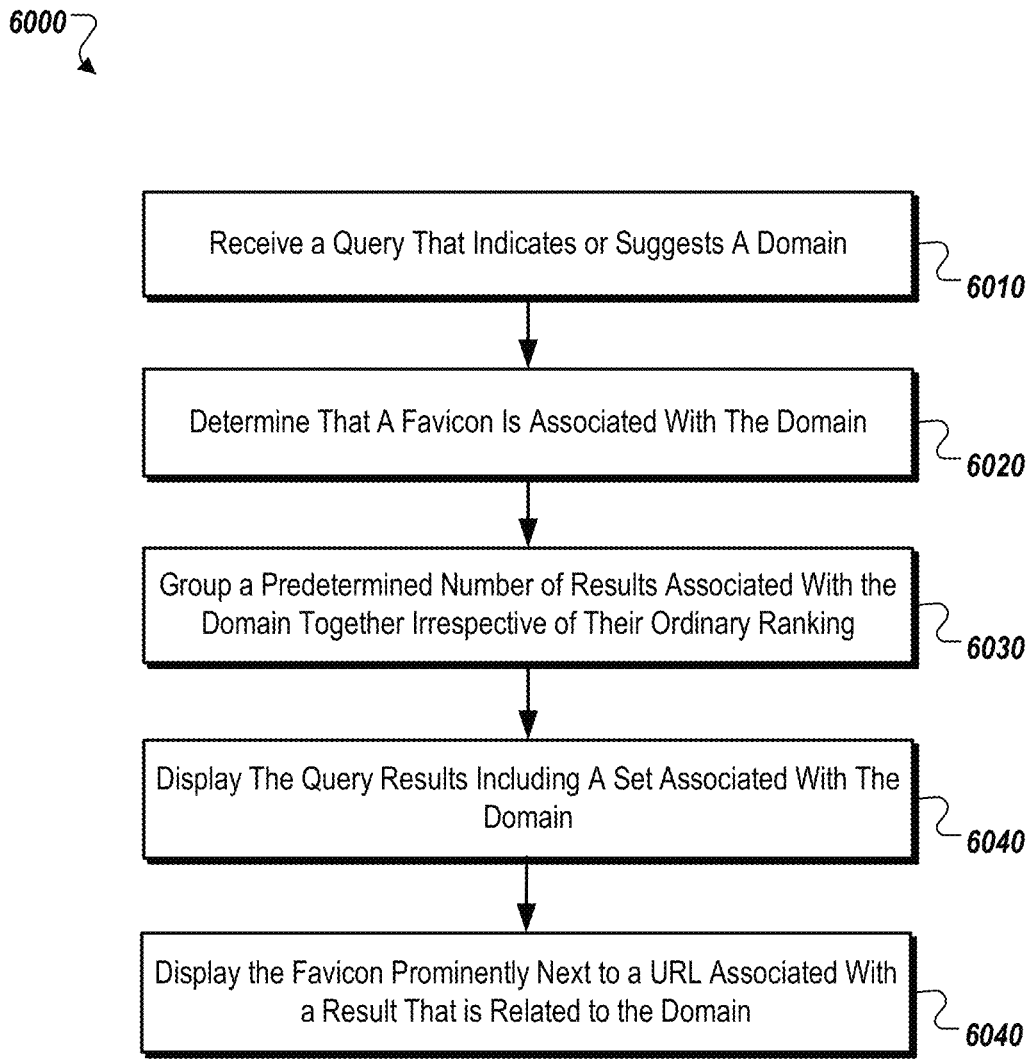
FIG. 6 shows an example method for displaying an indicator (e.g., a favicon) next to a URL associated with a result that is related to a domain.

FIG. 6 shows an example method 6000 for grouping search results (e.g., by domain) and displaying an indicator (e.g., favicon) next to a URL associated with a result that is related to a given domain. For example, the method 6000 can be a computer-implemented method that provides and displays sets of search results by domain and an indicator in proximity to search results displayed in a web browser on the user's client device 1004.

The method 6000 begins when a query is received that suggests a domain (step 6010). A query suggests a domain when the query is associated with the domain. For example, a search engine 1030 can receive a search query 1010 by way of a browser associated with a client device 1004. Based on the query 1010, the domain checker 1033 can determine if terms in the query 1010 are associated with a domain.

A determination is made that a favicon is associated with the domain (step 6020). For example, a favicon can be located in real time that is associated with an indicated domain. Alternatively, a web crawling service of the search system 1000 can crawl web sites on the Internet and populate the favicon index 1037 and the favicon associated with the domain can be retrieved from the index when needed.

A predetermined number of results associated with the domain are grouped together irrespective of their ordinary ranking (step 6030). For example, a set can be formed by the results optimizer 1035 of a first X entries associated with the indicated domain (where X is a predetermined number). For example, the set can be arranged in a group region 3004 that contains the search results related to the domain "imdb" 3003.

The search results including the set is presented to the user (step 6040).

As part of the presentation, the favicon associated with the domain is displayed next to a URL associated with a result (step 6050). In some implementations, the favicon is prominently displayed. For example, the favicon "xxx" 3006 is displayed to the left of the group region 3004.

Figure 7:
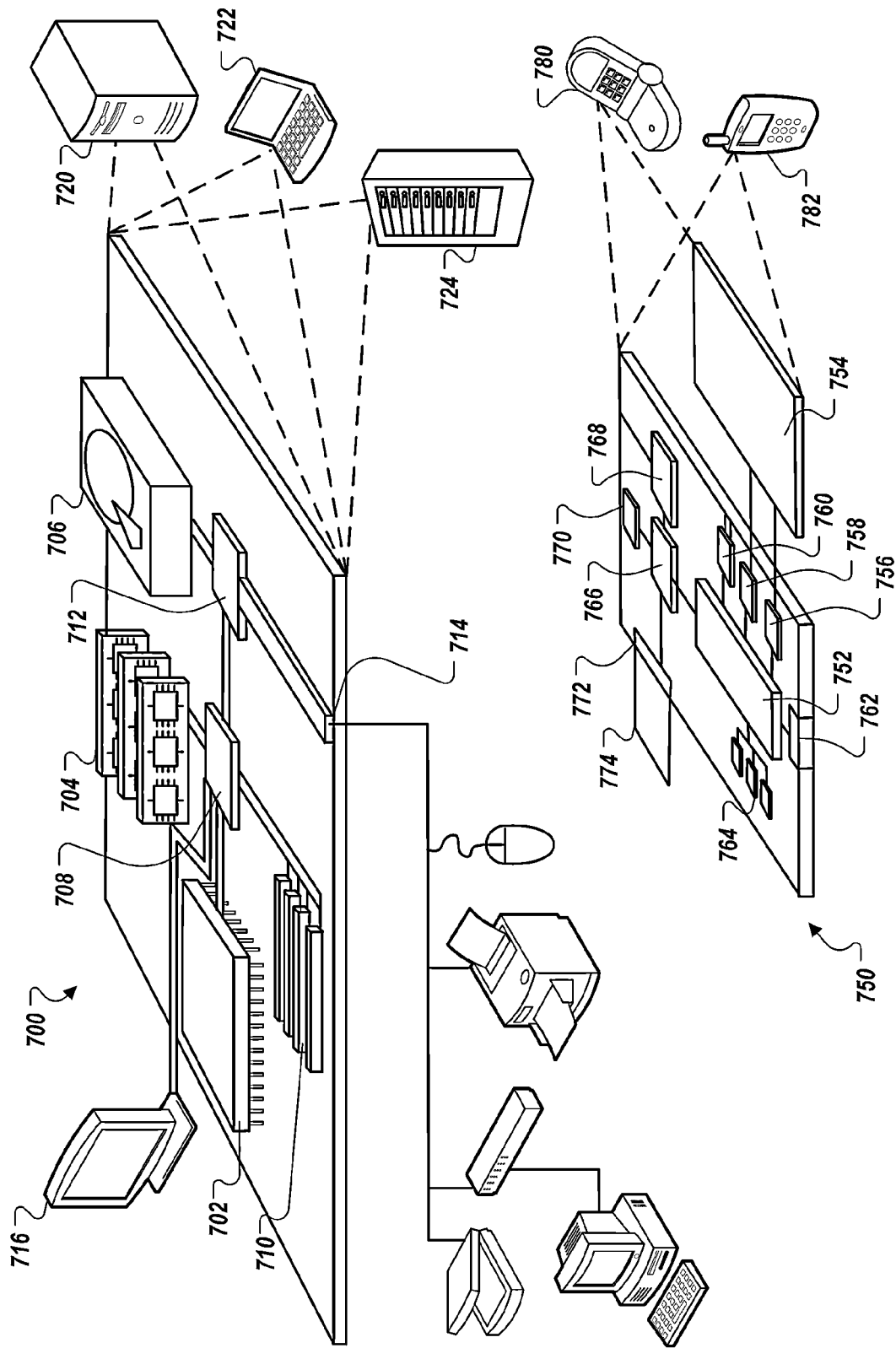
FIG. 7 shows an example hardware configuration that can be used with the system of FIG. 1.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in a computer storage medium. The computer program product contains instructions that, when executed, cause data processing apparatus to perform one or more methods, such as those described above. The computer storage medium is a computer- or machine-readable medium, such as the memory 704, the storage device 706, or memory on processor 702. Alternatively or in addition, the computer program product can be encoded on a propagated signal that is an artificially generated signal, e.g., a machine-generated electrical, optical, or electromagnetic signal, that is generated to encode information for transmission to suitable receiver apparatus for execution by a data processing apparatus.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. While reference is made to determining a single domain or host that is indicated in a search query, plural domains may be indicated in a single search query. In some implementations, plural sets of results, one for each domain indicated can be presented in the re-arranged search results. Accordingly, other embodiments are within the scope of the following claims.

What is claimed is:

1. A computer implemented method comprising:
   identifying a search query, the search query including one or more terms;
   determining that one or more terms in the search query are associated with a domain;
   receiving ranked search results responsive to the search query, the search results having a ranked order and including at least a first and a second search result each associated with the domain, wherein the second search result has a lower ranking in the ranked order than the first search result, and the second search result is not adjacent to the first search result in the ranked order;
   determining to group search results associated with the domain based at least on one of (i) a genericness or (ii) a diversity of the search results;
   in response to the determining, reordering the search results comprising:
      grouping a number of search results associated with the domain together to generate a new ranking, including promoting the lower-ranked second search result associated with the domain to be ranked adjacent to the first search result associated with the domain, and reordering the search results by the new ranking, wherein the first and second search results are adjacent in the new ranking, and the second search result is adjacent in the new ranking to a third search result associated with a different domain; and
   providing the reordered search results for presentation.

2. The method of claim 1, wherein determining that one or more terms in the search query are associated with a domain comprises determining that a term of the one or more terms of the search query is a domain name associated with the domain.

3. The method of claim 1, wherein determining that one or more terms in the search query are associated with a domain comprises determining that the search results include multiple search results associated with the domain.

4. The method of claim 1, wherein providing the reordered search results for presentation comprises:
   determining that the domain has an indicator associated with the domain; and
   providing, for presentation, the indicator in proximity to a particular search result associated with the domain.

5. The method of claim 4, wherein determining that the domain has an indicator associated with the domain comprises:
   evaluating an index of indicators to identify a matching indicator based on one or more words associated with the domain.

6. The method of claim 5, further comprising:
   crawling web properties to determine a plurality of indicators each associated with a respective domain; and
   storing, in the index of indicators, a plurality of identifiers each associated with a respective indicator, wherein the index of indicators is indexed by one or more words associated with a respective domain.

7. The method of claim 4, wherein the indicator is a favicon.

8. The method of claim 4, wherein the indicator is assigned by a domain holder.

9. The method of claim 4, wherein the indicator is an icon.

10. The method of claim 4, wherein providing the indicator in proximity to the particular search result for presentation comprises:
   providing, for presentation, the indicator adjacent to a URL associated with the particular search result.

11. The method of claim 1, wherein determining to group search results from the domain based on a genericness of the search results comprises:
   determining that a domain name associated with the domain is associated with more than a threshold number of meanings.

12. The method of claim 1, wherein determining to group search results from the domain based on a diversity of the search results comprises:
   determining that a number of domains associated with the search results is greater than a threshold number of domains.

13. The method of claim 1, wherein the number of search results grouped together is limited to a configurable number of entries to include in a group.

14. The method of claim 10, wherein providing the reordered search results for presentation comprises providing the search results for presentation on a user device, and wherein the method further comprises:
   designating the configurable number of entries to include in the group based on a type of the user device.

15. A system comprising:
   one or more computers and one or more storage devices storing instructions that are operable, when executed by the one or more computers, to cause the one or more computers to perform operations comprising:
   identifying a search query, the search query including one or more terms;
   determining that one or more terms in the search query are associated with a domain;
   receiving ranked search results responsive to the search query, the search results having a ranked order and including at least a first and a second search result each associated with the domain, wherein the second search result has a lower ranking in the ranked order than the first search result, and the second search result is not adjacent to the first search result in the ranked order;
   determining to group search results associated with the domain based at least on one of (i) a genericness or (ii) a diversity of the search results;
   in response to the determining, reordering the search results comprising:
      grouping a number of search results associated with the domain together to generate a new ranking, including
      promoting the lower-ranked second search result associated with the domain to be ranked adjacent to the first search result associated with the domain, and
      reordering the search results by the new ranking, wherein the first and second search results are adjacent in the new ranking, and the second search result is adjacent in the new ranking to a third search result associated with a different domain; and
   providing the reordered search results for presentation.

16. The system of claim 15, wherein determining that one or more terms in the search query are associated with a domain comprises determining that a term of the one or more terms of the search query is a domain name associated with the domain.

* * * * *